April 29, 1941.    G. E. HOWARD    2,239,962
MOTOR VEHICLE CONTROL APPARATUS
Filed Nov. 7, 1939
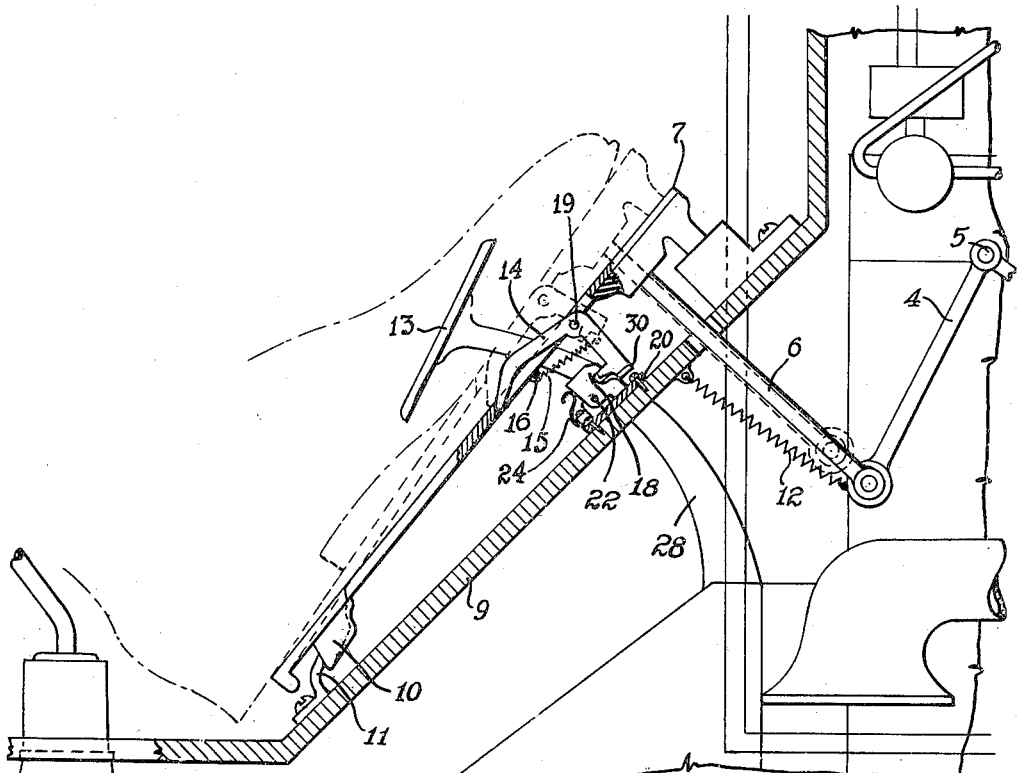
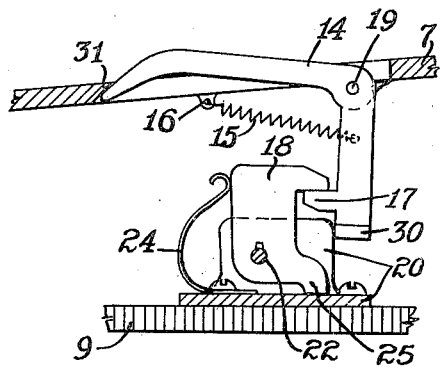
Fig. 3.    Fig. 4.
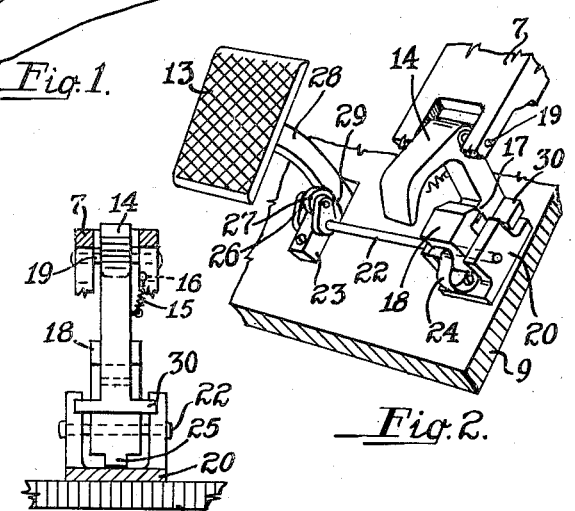
Fig. 2.
INVENTOR
George E. Howard,
By Archworth Martin,
Attorney.

Patented Apr. 29, 1941

2,239,962

UNITED STATES PATENT OFFICE 2,239,962

MOTOR VEHICLE CONTROL APPARATUS

George E. Howard, Butler, Pa.

Application November 7, 1939, Serial No. 303,244

3 Claims. (Cl. 192—3)

In the operation of automobiles, the driver frequently desires to be relieved of the physical strain or tension of constantly maintaining his foot on the accelerator pedal, and will sometimes move a hand-operated rod to such position that it will hold the throttle in open position. Also, it has been suggested that a latch device be employed to hold the accelerator pedal in depressed position. However, in many states such expedients are legally forbidden, because if the operator wishes to stop the vehicle quickly, the supply of motive fluid will be continued during operation of the brake pedal, with consequent slower rate of speed reduction.

My invention has for its object the provision of means whereby a manually-operated control for the supply of fuel will be actuated automatically to cut off the fuel supply at the instant that the operator depresses the brake pedal.

In the accompanying drawing, I have shown an accelerator pedal which may be latched in depressed position and which will automatically be released to permit closing of the throttle valve when the driver operates the brake pedal to stop or reduce the speed of the car, and it will be understood that the invention is capable of use also in connection with other types of manually-actuated throttles.

In the accompanying drawing Figure 1 is a longitudinal sectional view showing the application of my invention to the accelerator pedal and associated parts of an automobile; Fig. 2 is a perspective view of a portion of the apparatus of Fig. 1; Fig. 3 is a view on an enlarged scale of a portion of the apparatus of Fig. 1, and Fig. 4 is a front view thereof.

The numeral 4 indicates a bell crank lever that is pivotally supported by a fixed pivot 5 upon the engine block and has connection (through a link not shown) with the throttle valve of the engine, as is common in the art and as shown, for example, in my Patent No. 2,156,116, issued April 25, 1939. A link or thrust rod 6 has pivotal connection with one arm of the bell crank 4 and is engaged by an accelerator pedal 7, which has at its lower end a hinged connection with the floorboard 9, this pivotal connection being here shown as a soft rubber block 10 in which is embedded a metal prong 11 that is secured to the floorboard. A tension spring 12 is connected at one end to the crank 4 and its other end to the floorboard, so as to bias the bell crank 4 in a clockwise direction to hold the throttle valve closed. When the pedal 7 is depressed, it will rock the bell crank lever 4 to open the valve, in the usual manner.

The foregoing elements may all be of conventional form. Likewise the brake pedal 13, when depressed, will effect application of the brakes to the vehicle wheels in any well-known manner.

My invention will be of particular utility on vehicles which have automatic speed governors for stabilizing vehicle speeds, in that the driver may latch the accelerator pedal in its depressed position and the vehicle speed will then be controlled solely by the governor, until such time as the operator initiates the actuation of the brake pedal or releases the latch.

The pedal 7 is slotted to receive a latch lever 14 that is pivotally connected at 19 to the pedal, the lever 14 being biased in a clockwise direction by a tension spring 15, one end of which is anchored to a lug 16 on the underside of the pedal and the other end of which is connected to the latch lever.

The lower portion or leg of the lever 14 has a lug or hook 17 for engagement with a dog 18 that is supported by a block 20 that is secured to the floorboard 9. This latching engagement is effected when the pedal 7 is depressed to open the throttle valve and the operator's foot is moved away from the lever 14, which permits the spring 15 to move the lever into latched engagement with the dog 18.

The dog 18 releasably holds the pedal in latched-down position, and is rigidly secured to a crank shaft 22 that is journalled in the block 20 and a block 23 that are secured to the floorboard 9. A spring 24 biases the dog 18 in a clockwise direction, the dog having a stop shoulder 25 that limits such clockwise movement, by engaging the base of the block 20.

At its other end, the shaft 22 is provided with a crank arm 26 in which is journalled an anti-friction roller 27 that is yieldably held in engagement with the brake lever 28, by the pressure exerted by the spring 24 against the dog 18. The lever 28 is recessed at its rear edge, as shown at 29 in Fig. 2, and the roller lies within the recess when the pedal 13 and its lever 28 are in raised position, at which position of the parts the stop 25 is in engagement with the block 20. When the pedal 13 is depressed, the rock shaft 22 and the dog 18 will be rocked in a counter-clockwise direction, against the pressure of the spring 24. The dog 18 is thereby moved to release position with respect to the latch member 17. The lever 14 can therefore be latched only when the brake pedal is in its upper (released) position. Also, the lever 14 can be latched only when the operator's foot is shifted on the accelerator pedal 7 to release the latch lever 14, which will permit the spring 15 to rock the lever 14 clockwise. Lugs 30 on the latch lever limit clockwise movement thereof, by engaging the block 20. When the pedal 7 is in raised position, clockwise movement of the lever 14 is limited by engagement thereof with the pedal, at 31.

In case it is desired to operate the vehicle in the present usual manner, the operator will simply place his foot on the pedal 7 and hold it there. With his foot so placed, the upper leg of the lever 14 will be depressed (as indicated in broken lines in Fig. 1) and the lower leg thereof will be maintained out of engagement with the dog 18. When the operator desires to latch the pedal 7 in its depressed position, he will shift his foot from the latch lever 14, allowing it to effect latched engagement with the dog 18. Thereafter light foot pressure upon the lever 14 will disengage the latch and permit the accelerator pedal 7 to be moved upwardly under the tension of the spring 12.

However, should it become necessary to quickly reduce the speed of the vehicle, the operator will desire to actuate the brake pedal 13 immediately without taking time first to release the latch lever 14. By the arrangement shown in the drawing, immediate application of the brake pedal can be had, with assurance that the foot pedal will be released, since at the start of downward movement of the brake pedal 13, the shaft 22 will be rocked to move the dog 18 counter-clockwise, so that the pedal 7 will be in a release position through upward pull by the spring 12 upon the pedal. When the brake pedal 13 is released, it will, of course, be returned to its uppermost position, as shown in the drawing, under the pull of springs present in brake rigging, and the dog 18 will be returned to its operative position, as shown in the drawing, under the force of the spring 24.

From the foregoing it will be seen that when the car is traveling at its normal full speed, with the accelerator pedal 7 in its latched-down position, and especially when a speed regulator is provided on the vehicle, the operator can rest his foot on the floorboard and avoid the physical cramp and exhaustion that would otherwise be caused by his having to continually press the pedal down against the tension of the spring 12. Also his attention need not be diverted from the road to the speedometer, but if he wishes to reduce the speed, he can simply put his foot on the pedal 7 and control the flow of fuel from the carburetor to suit conditions.

If, while the accelerator pedal is in its latched-down position, a sudden emergency arises which demands immediate reduction in speed or stopping of the vehicle, the operator will simply place his foot upon the brake pedal 13, and the fuel supply from the carburetor will automatically be cut off without the operator having first to give attention to the accelerator pedal.

I claim as my invention:

1. The combination with an accelerator pedal of an automobile, of a latch lever of bell crank form, pivotally connected to the pedal and having one arm thereof normally projecting above the plane of the pedal and the other arm extending downwardly, a dog, means on said downwardly-extending arm for making latched engagement with the dog, means yieldably urging the said latching arm into engagement with the said dog when the pedal is in depressed position and the operator's foot is out of engagement with the upper arm of the lever, an upwardly-projecting brake lever, and means actuated upon downward movement of the brake lever, for effecting unlatching of the dog and the said latch lever.

2. The combination with an accelerator pedal of an automobile, of a latch lever of bell crank form, pivotally connected to the pedal and having one arm thereof normally projecting above the plane of the pedal and the other arm extending downwardly, a dog, means on said downwardly-extending arm for making latched engagement with the dog, means yieldably urging the said latching arm into engagement with the said dog when the pedal is in depressed position and the operator's foot is out of engagement with the upper arm of the lever, an upwardly-projecting brake lever, a rock shaft having connection with said dog for movement of the dog out of latching position upon movement of the shaft in one direction, and means actuated upon downward movement of the brake lever, for rocking said shaft in a direction to unlatch the dog from the said latch lever.

3. The combination with an accelerator pedal of an automobile, of a latch lever of bell crank form, pivotally connected to the pedal and having one arm thereof normally projecting above the plane of the pedal, within the lateral boundaries thereof, and the other arm extending downwardly, a dog, means on said downwardly-extending arm for making latched engagement with the dog, means yieldably urging the said latching arm into engagement with the said dog when the pedal is in depressed position and the operator's foot is out of engagement with the upper arm of the lever, an upwardly-projecting brake lever, and means actuated upon downward movement of the brake lever, for effecting unlatching of the dog from the said latch lever.

GEORGE E. HOWARD.